(12) United States Patent
Diamond et al.

(10) Patent No.: US 11,129,230 B1
(45) Date of Patent: Sep. 21, 2021

(54) EMERGENCY-RESPONSIVE COMMUNITY AND BUILDING INFRASTRUCTURE CONTROL

(71) Applicant: FORD GLOBAL TECHNOLOGIES, LLC, Dearborn, MI (US)

(72) Inventors: Brendan Diamond, Grosse Pointe, MI (US); Erik J. Christen, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/821,345

(22) Filed: Mar. 17, 2020

(51) Int. Cl.
*G07C 9/00* (2020.01)
*G01C 21/20* (2006.01)
*H04W 76/50* (2018.01)
*H04W 4/90* (2018.01)
*H04W 4/024* (2018.01)
*H04W 4/33* (2018.01)
*G07C 9/38* (2020.01)
*H04W 4/40* (2018.01)

(52) U.S. Cl.
CPC .......... *H04W 76/50* (2018.02); *G01C 21/206* (2013.01); *G07C 9/00571* (2013.01); *G07C 9/00904* (2013.01); *G07C 9/38* (2020.01); *H04W 4/024* (2018.02); *H04W 4/33* (2018.02); *H04W 4/40* (2018.02); *H04W 4/90* (2018.02)

(58) Field of Classification Search
CPC ....... H04W 76/50; H04W 4/024; H04W 4/90; H04W 4/33; H04W 4/40; G07C 9/00904; G07C 9/00571; G07C 9/38; G01C 21/206
See application file for complete search history.

(56) References Cited

U.S. PATENT DOCUMENTS

| | | | |
|---|---|---|---|
| 5,150,096 A * | 9/1992 | Lake, Jr. ............ | G01C 21/3407 340/286.13 |
| 8,463,546 B2 | 6/2013 | Rolinski et al. | |
| 8,498,807 B2 | 7/2013 | Moore et al. | |
| 9,478,084 B1 * | 10/2016 | Robinson ................. | G07C 9/38 |
| 9,719,789 B2 | 8/2017 | Beaurepaire | |
| 2016/0334236 A1 * | 11/2016 | Mason ..................... | G08G 1/22 |
| 2018/0356241 A1 | 12/2018 | Correnti et al. | |

* cited by examiner

*Primary Examiner* — Joseph E Dean, Jr.
(74) *Attorney, Agent, or Firm* — Michael Spenner; Brooks Kushman P.C.

(57) ABSTRACT

An emergency dispatch system may determine that an emergency vehicle has been dispatched to a predefined gated community, based on a dispatch address being within the gated community. The system may access a database to obtain a custom map pre-associated with the gated community. The system may also determine a path to an emergency location within the gated community, based on the custom map and send the path and the custom map to the vehicle, responsive to determining the path.

18 Claims, 3 Drawing Sheets

EMERGENCY-RESPONSIVE COMMUNITY AND BUILDING INFRASTRUCTURE CONTROL

TECHNICAL FIELD

The illustrative embodiments generally relate to methods and apparatuses for emergency-responsive community and building infrastructure control.

BACKGROUND

Many communities have access gating that is electronically controlled. When a resident arrives or exits, they can input a code or use a transponder to signal a need to control a gate, and the gate responds. Of course, if an emergency occurs, an emergency medical services (EMS) vehicle will also need to access the gate, and the EMS vehicle may not have the code or transponder signal necessary to control the gate.

Within the community, there may be locked doors, elevators and preferred paths (e.g., service elevators) for a large object, such as a stretcher. An EMS technician may need to access a building, access an elevator and find a route suitable for a stretcher. When a critical medical condition is occurring, time spent sorting through various ingresses, egresses and paths can be time that is lost that could be used to assist a person.

Further, communities themselves may have optimal pathing for certain paths. For example, a building may have one road leading to a front access, and another leading to a rear access with service elevator access. If the EMS vehicle went to the front door (which would be the typical route associated with a navigation instruction), but needed the service elevator, the vehicle might have to re-route to the rear door access, spending valuable time traveling.

Many apartment buildings, assisted living facilities, and hotels also have tens or even hundreds of rooms within. Finding an efficient and clear path to a given residence within a building can also be a time-consuming process. Elevators may be located on the wrong floor, and upon exiting an elevator, the EMS technicians may spend time determining which hallways to turn down to arrive at a given room.

At the same time, vehicle location is trackable as EMS vehicles are typically connected to a cloud-based system that allows communication of both data and location.

SUMMARY

In a first illustrative embodiment, a system includes a processor configured to determine that an emergency vehicle has been dispatched to a predefined gated community, based on a dispatch address being within the gated community. The processor is further configured to access a database to obtain a custom map pre-associated with the gated community. The processor is also configured to determine a path to an emergency location within the gated community, based on the custom map and send the path and the custom map to the vehicle, responsive to determining the path.

In a second illustrative embodiment, a system includes a processor configured to determine that an emergency vehicle has been dispatched to a predefined gated community, based on a dispatch address being within the gated community. The processor is also configured to access a database to obtain a custom map pre-associated with the gated community. The processor is further configured to determine a path to an emergency location within the gated community, based on the custom map, the path including a footpath and any building accesses for accessing the emergency location. Also, the processor is configured to determine, based on a record in the database, access credentials associated with any restricted access points along the path and facilitate emergency technician pass-through of the restricted access points by delivering access credentials, usable to pass through the restricted access points, to an entity chosen based on a type of access credential required, as indicated by the record.

In a third illustrative embodiment, a system includes a processor configured to determine that an emergency vehicle has been dispatched to a predefined gated community, based on a dispatch address being within the gated community. The processor is also configured to access a database to obtain a custom map pre-associated with the gated community. Further, the processor is configured to determine a path to an emergency location within the gated community, based on the custom map, the path including a footpath and any building accesses for accessing the emergency location. Additionally, the processor is configured to determine, based on a record in the database, access credentials associated with any restricted access points along the path. Also, the processor is configured to facilitate emergency technician pass-through of the restricted access points by delivering access credentials, usable to pass through the restricted access points, to an entity chosen based on a type of access credential required, as indicated by the record, wherein the processor is configured to deliver one or more access credentials responsive to the emergency vehicle reaching a location within a predefined distance of a given restricted access point.

DETAILED DESCRIPTION

Figure 1:
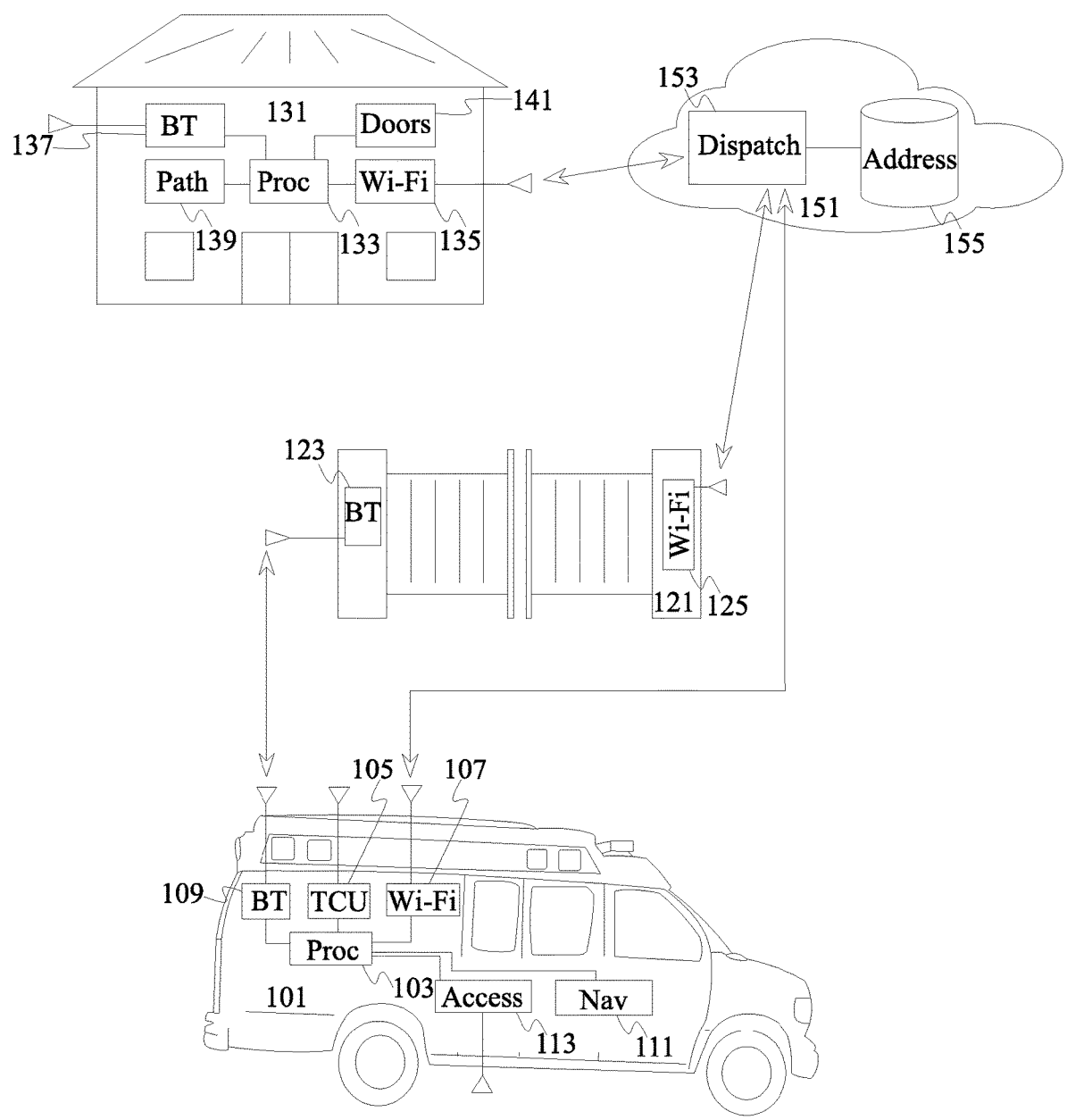
FIG. 1 shows an illustrative example of an emergency response system, including a smart-community, a cloud system and an emergency vehicle.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

The illustrative embodiments may improve response time by solving many small inefficiencies commonly encountered in an emergency situation. For example, if a community may include an access-restricted gate, thirty numbered buildings, each with a separate service entrance, and each with four floors, each floor including ten units, and electronically controlled doors for both the buildings and the individual units. The community may also include a plurality of Wi-Fi transceivers and a centralized control system. Information pertaining to the layout of each building and access codes for various doors may be stored in a central database.

When an EMS vehicle responds to an emergency within the community, the illustrative embodiments may provide a way for the vehicle to access the gated community. This could be by providing a code, providing a transponder signal, or simply pushing an instruction for the gate to open. With regards to the opening of the gate, and any other triggered on-site processes, these processes could simply happen in response to the call or could be triggered by the arrival or proximity of the EMS vehicle. For example, the vehicle could connect to a local Wi-Fi network for the community upon arrival, and the vehicle location within the community could be tracked via the network. In other instances, all unlock, open, control elevator, etc. commands could simply be processed in response to the emergency, which would be a solution that eschewed a measure of security to minimize potential miscues about where the vehicle is located. The illustrative embodiments will be described in a manner that is reactive to an EMS vehicle or technician presence, but it is appreciated that many of the automated access processes could also simply be engaged until an emergency was mitigated.

Upon receiving the call, the EMS vehicle is dispatched to the gated community. It receives a transponder code that is pushed to a reprogrammable transponder within the EMS vehicle. The code is transmitted when the vehicle reaches the gate, allowing for access. The vehicle also receives turn-by-turn directions directing the vehicle to the appropriate building and building entrance. The EMS technician, or a public service access provider (PSAP) technician can input any special requirements (e.g., stretcher), which can be accommodated based on building details stored in the database. That is, if a different entrance is required for service elevator access, the route provided could be to the closest access to the service elevator.

The system can also push unlock commands to any electronically controllable doors within the building, which can unlock responsive to the EMS vehicle being within a certain proximity (as indicated by vehicle GPS reporting, vehicle connection to a local Wi-Fi network, a vehicle BLUETOOTH or other short-range signal, etc. At the same time, the system can reserve or lock-out a desired elevator, which can send the elevator to the appropriate floor for access, and prevent use of the elevator until the vehicle is within a certain proximity. If the EMS technicians had a dedicated mobile device (phone, tablet, etc) that they carried with them, some of the responsiveness (door unlock, elevator unlock, etc) could be responsive to the presence of the portable device. Any and all access credentials or identifying credentials could be pushed to both the device and/or the local system, to help ensure proper identification of the device and access to any local networks.

The system could also plan a path within the building, based on a known location of a person experiencing an emergency. The device used to signal the emergency (phone, bracelet, etc) could provide location coordinates and/or a room number, and this can be used in conjunction with a building schematic to determine a suitable internal path to the occupant. Any intervening electronically controllable systems (doors, elevators, etc) can be configured to be unlocked or be unlocked responsive to EMS presence, providing for smooth and fast access to the patient. The path could be pushed to the EMS portable device, telling the EMS technician exactly where to go when inside the building.

The system can also push lighting control instructions to both the community and/or the building. For example, emergency lighting (e.g., blue lights) can be used to illuminate an external road-way path to the building, if the community is equipped with such lighting. This makes it very easy for the EMS operator to see exactly where to go. Within the building, hallway lighting or emergency lighting can be varied to indicated the correct path. The increasing prevalence of color-changeable LEDs and dimmable LEDs can assist in this pathing, wherein the path to a person's room could be illuminated in a different color using existing fixtures. In other examples, standard existing lighting could be better-lit or dimmed to distinguish between emergency paths and other paths. Lights can also be pulsed or manipulated in other patterns to distinguish the preferred path.

People could even provide individual home access through this method. If a person was living in a single family home, the access routes in the home could be uploaded by the owner or another person, access codes to electronic locks and garage doors could be provided, and thus even a person in a single family residence who fell in an upstairs bathroom, for example, could benefit from application of the system. In that situation, the EMS technician could gain electronic front door access and know exactly where the stairways were and where the bedroom was located. While each efficiency may only save minutes, or even seconds, those can be critical minutes or seconds in an emergency situation.

FIG. 1 shows an illustrative example of an emergency response system, including a smart-community, a cloud system and an emergency vehicle. In this example, The emergency vehicle 101 includes one or more onboard processors 103. These processors control a variety of communication systems and applications, which, in this example, include a telematics control unit (TCU) 105, a Wi-Fi transceiver 107, and a BLUETOOTH or other short-range transceiver 109. A reprogrammable transponder may also be provided, which is contemplated as part of a gate-access routine 113 in this example. The vehicle may further include a navigation process 111, capable of displaying road-way and building direction sets for an EMS responder.

This example also shows a controllable gate 121. The gate may have multiple access controls associated therewith, including an access pad (not shown), a short-range wireless communication transceiver or receiver 123, shown as a BLUETOOTH transceiver in this example, and a wide-area network controller such as a Wi-Fi 125 or internet hardline. The gate can use short-range communication or Wi-Fi communication to detect the presence of the EMS vehicle 101, or the gate can use cloud-based instructions and notifications to determine when the vehicle has arrived. The cloud communication can also be used to upload access provisions to the gate, which may include a short-term usable credential that allows for EMS access during a certain window, before expiring. This could help prevent malicious use or replication of an EMS credential.

This example also includes a smart-building 131. This building includes a central server and processor 133 in this example, but the building could also have discrete controllable microprocessors associated with various systems and not be generally centrally connected, if preferred. In this example, the central system can communicate with the cloud through Wi-Fi transceiver 135 or a wired connection, and also includes a short-range communication system such as BLUETOOTH transceiver 137 if short-range communication with the EMS vehicle 101 is desired (to detect arrival, for example).

The system further includes controllable lighting and a process 139 for delineating a lighting path, as well as controllable doors and elevators, and a process for reserving elevators and unlocking doors 141. Again, as noted before, a given control strategy can be triggered responsive to the emergency call, to confirmation of an emergency (e.g., to prevent spoofing an emergency to gain access), or to arrival of a vehicle 101 or personnel (detectable through a device carried by personnel, or code input, etc).

The system also includes a cloud 151 based dispatch system 153 that can coordinate between vehicles and infrastructure elements to indicate vehicle location and triggering of processes. The dispatch system 153 can also access a database of local navigation elements 155, which can include, for example, community layouts, floorplans, access codes, etc. The dispatch system 153 can use existing access code to provide those codes to the EMS vehicle 101, and/or can be responsible for management of temporary access codes and pushing those codes to the appropriate vehicles 101 and/or infrastructure elements 121, 131. The system may further report vehicle 101 locations if needed, reserve elevators and generally ensure that access instructions are triggered at appropriate times based on locations and/or needs of EMS responders.

Figure 2:
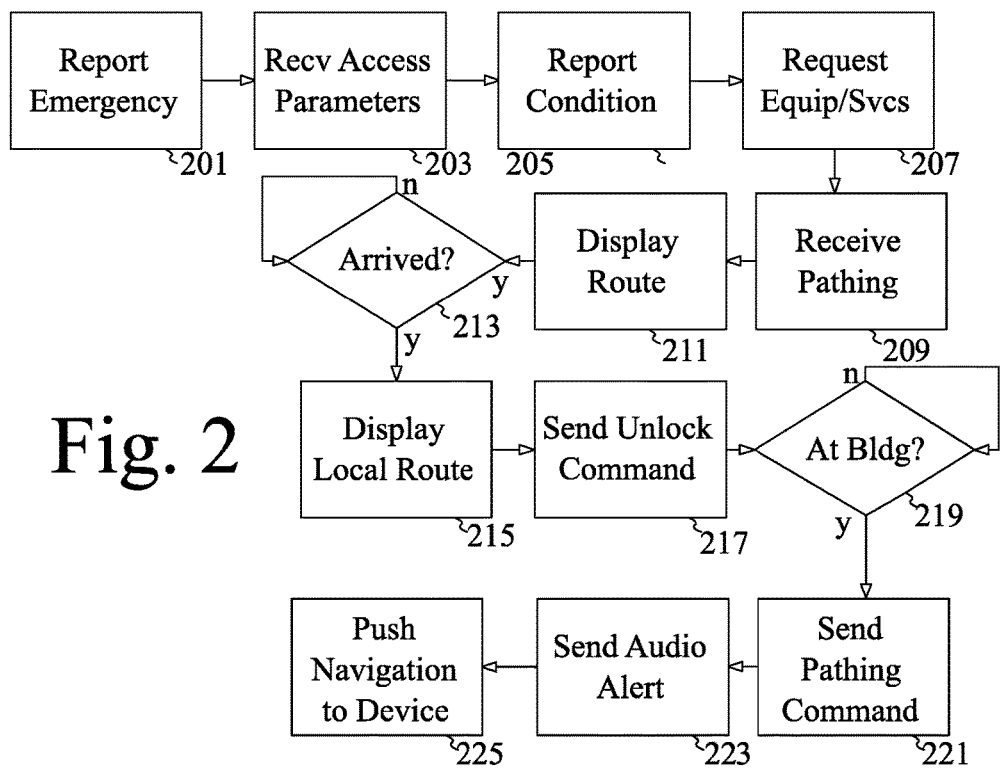
FIG. 2 shows an illustrative example of a vehicle-side response process.

FIG. 2 shows an illustrative example of a vehicle-side response process executable by, for example, the processor 103 of the EMS vehicle 101. The vehicle 101 in this example, reports that it is en-route or otherwise confirms the response at 201. While this step is not necessary, since access codes are going to potentially be released and/or provisioned, it may be useful to know which EMS vehicle 101 is going to respond. In other instances, the codes may be provisioned for and distributed to any number of vehicles 101 that represent potential responding vehicles.

In response to the confirmation, the vehicle 101 receives access parameters at 203. This can include, for example, gate codes, gate transponder signals, wireless access credentials, etc. This may also include one or more codes or signals the vehicle 101 can use to indicate presence at a location. For example, the vehicle 101 may receive a code that causes all building exterior doors to unlock when the vehicle is present at the building and transmits the code to the BLUETOOTH receiver or other short-range receiver when the vehicle 101 arrives at the building. Any suitable short-range transmission medium may be used to communicate the codes, if such codes are utilized.

Also, in this example, the vehicle 101 may report the emergency condition as indicated by an EMS tech at 205 and/or report any equipment or special services required at 207. For example, the tech may indicate that a gurney will need to be wheeled into the building and/or access to a defibrillator may be needed. In other instances, the tech may generally simply indicate that the patient will likely need to be removed. The dispatch system 153 can take a more generalized indicator (such as that a patient will need to be removed) and correlate this information with any on-site medical equipment (e.g., a local stretcher or defibrillator). If the on-site equipment is lacking, this information can be communicated back to the technician so the technician knows what equipment will need to be brought into the building from the vehicle 101.

The dispatch system 153 can also calculate any pathing (intra-community, intra-building, etc) and the vehicle 101 can receive this information at 209 responsive to indicating any specialized requirements for ingress or egress. The vehicle 101 can then display the route to reach the community at 211, and adapt this displayed pathing based on where the vehicle 101 is located. For example, upon reaching the community, the vehicle 101 can shift the display to a local intra-community display and path, and upon reaching a building or being proximate to a building, the vehicle 101 can display an intra-building path or a walking path from the vehicle 101 to a building ingress.

In this example, the vehicle 101 persists in display of the route to reach the community until the vehicle 101 arrives at the community at 213 (or is proximate within a predefined distance). Once the vehicle 101 is within range for a map shift at 213, the vehicle 101 can shift the display to show the route within the community at 215. This can include pushing any local instructions to infrastructure (e.g., requesting an identifiable lit path) and/or notifying the cloud and/or infrastructure that the vehicle 101 is onsite in the community. In this example, arrival of the vehicle 101 at the community also causes the vehicle 101 to send an unlock command (over a local network or through the cloud) at 217. This can be a command that causes a building door to unlock and/or elevators to be reserved and/or a room door to unlock.

Once the vehicle 101 arrives at the building at 219, the vehicle 101 sends a pathing command at 221, which, in this example, causes adaptive building interior lighting to illuminate a path to a room. This can also be the basis for a push of the interior building mapping from a vehicle 101 to a portable device (not shown). If the portable device is employed, additional access and trigger information can be pushed to the portable device at 225 to assist in having the building react to the presence of the device within proximity to various controllable systems. The arrival of the vehicle 101 may also cause the vehicle 101 to instruct an alarm signal 223 from either the device used to place an emergency call (e.g., a cell phone) or to another patient-associated alarm device. Requesting this audible signal (and having a device output a corresponding alert signal) can assist the responders in audibly locating a person, which could be useful especially if building pathing is not known (e.g., the person is within a single family dwelling that is not mapped).

Doors can be unlocked by the building responsive to arrival of the vehicle 101 (reported via a local wireless signal or based on vehicle navigation data reported to the dispatch process 153) and/or responsive to a signal from a portable device provided with access credentials. In a similar manner, elevators can be locked, reserved and/or sent to a given floor to minimize elevator response time if the elevator is needed by the EMS personnel. All onsite building controls can be responsive to the general dispatch, or arrival of a vehicle, or the presence of a portable device, as is appropriate for a given situation. Even if a building has a general policy associated therewith (e.g., door do not unlock until EMS personnel are on-site), this policy could be dynamically adaptable to situations where seconds could matter (e.g. stroke), to ensure maximum access in minimum time. So, for example, if the EMS tech or caller does not indicate such a critical situation, then the unlock process occurs as the vehicle or techs arrive at a given checkpoint, but if the caller indicates the situation to be time-critical (or if the EMS confirms this scenario), the dispatch process could instruct immediate unlock of all relevant doors and immediate repurposing of the elevator, for example.

Figure 3:
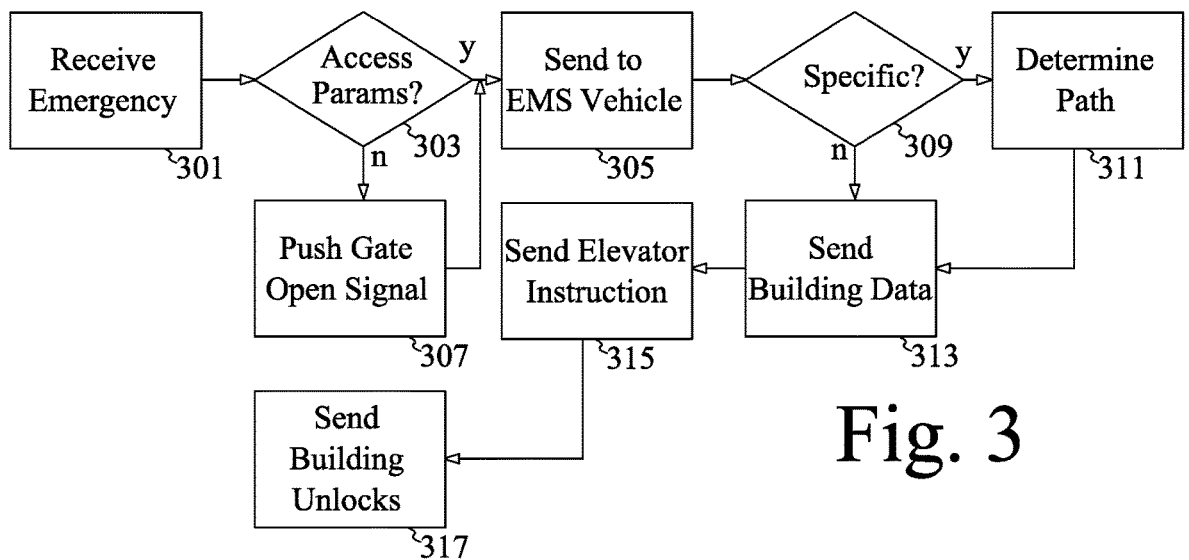
FIG. 3 shows an illustrative example of a cloud-side response process.

FIG. 3 shows an illustrative example of a cloud-side response process executable by, for example, the dispatch system 153. In this example, the dispatch system 153 receives notification of the emergency at 301 from a PSAP or the EMS vehicle 101. The system can look up an address associated with the emergency and determine whether or not the vehicle 101 or techs will need any access permissions, and/or whether such permissions can be granted at 303.

While city code may mandate EMS access for certain systems, older systems may not employ the most up-to-date technology, and so in some cases the access may be limited to an instruction pushed from the cloud to open a gate or input of a physical code. In other cases, the vehicle 101 may be provided with access codes that will work upon arrival based on wireless signaling. The system 153 can use information stored in the database 155 to determine which types of codes and instructions need to be sent where.

If the gate is not responsive to any vehicle arrival or signaling, the system 153 may push a gate-open instruction directly to the gate (if possible) at 307. In such a case, for example, the gate may simply open and remain open until the gate receives a signal from the dispatch system to close. While this is a less secure solution, it also ensures that the EMS vehicle is not waiting at the gate while an attempt to remotely open the gate is made. This signal could also be pushed when the EMS vehicle is within a certain distance from the gate, to minimize the amount of time the community is open to others.

In other cases, where the gate can respond to EMS vehicle 101 signaling or code input, the system 153 may transmit the necessary signals or codes directly to the vehicle 101 at 305. If this includes a temporary limited-use code, the system 153 may transmit the corresponding code or signal to the gate for verification purposes.

Also, in this example, the system 153 determines at 309 if a specific path through a building needs to be determined. A similar process could occur for navigation purposes within a community, if localized intra-community pathing was needed. Here, if there is a building path needed (e.g., if the location in the building is known and a floor plan for the building is contained in database 155), the process can determine the path within the building at 311. This can include accommodating any special access provisions (need of passenger or freight elevators) or facilities needs (including a path that travels past a known defibrillator location). The process then sends any building data at 313, which can include the onsite pathing if calculated. This data can also include wirelessly transmittable access credentials for the building if triggered access is to be provided.

The system 153 may further request access to any needed building elevators at 315. This can include indicating a need for the elevator on a given floor at a certain time (e.g., a projected arrival time minus a threshold). In other examples, the request can be an immediate demand for an elevator but may not process until a vehicle 101 is within a certain distance of the building. The elevator can be instructed to travel to a given floor and not unlock until a portable EMS technician device is present, or a vehicle has arrived, etc. Similarly, the system 153 can send the access and unlock instructions to the building 317 and any corresponding access credentials to the vehicle 101. Again, unlock can be general (immediate and persistent), or responsive to arrival of a vehicle 101 at the building or a portable device wireless signal at a given access point.

Figure 4:
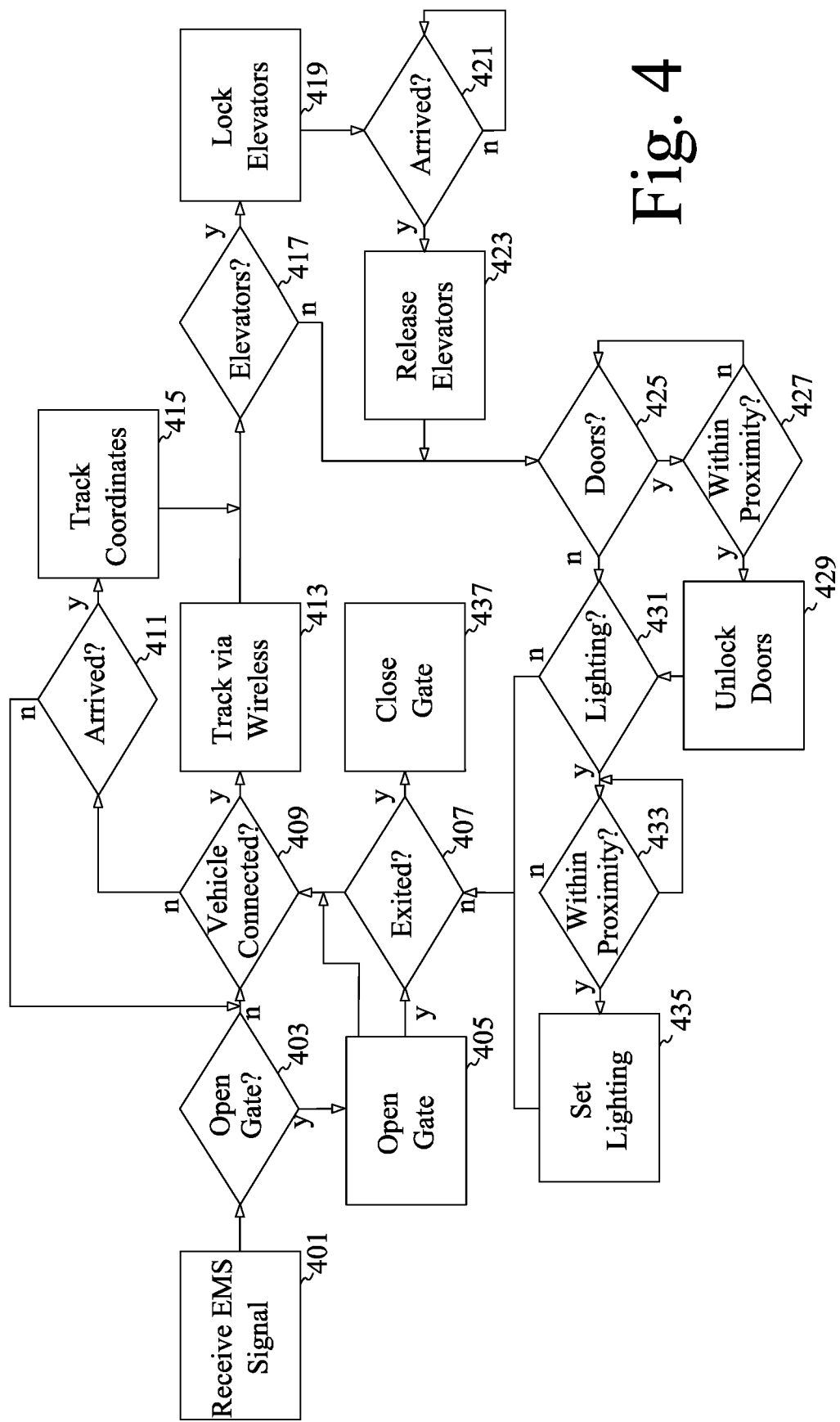
FIG. 4 shows an illustrative example of a community-side response process.

FIG. 4 shows an illustrative example of a community-side response process. In this example, the community-side server or central control process (if this exists) can receive an EMS notification at 401. While not shown, in certain instances security may dictate a check on the situation, and so an additional security check can be required if desired. This can prevent a fake call from unlocking a gate, building and/or room.

Once any necessary precautions are resolved, the system, such as a central processor 133, can determine if an immediate gate-open is requested at 403. If the gate-open was requested (for example, if the vehicle 101 cannot use a code to enter), the processor 133 may instruct opening of a community gate at 405. In such instances, the gate may remain open until the processor 133 receives an indication that the vehicle 101 has exited the community at 407.

If the processor does not need to open the gate at 403, then the processor 133 may wait until the vehicle has connected to a local network at 409. For communities with a local wireless network, the vehicle 101 can be provided with wireless network credentials and the vehicle 101 can be tracked through the community based on communication with wireless access points, for example, at 413. If the processor 133 receives an indicator that the vehicle has arrived at 411, but the vehicle 101 never connected to the network at 409, then the processor 133 may elect to use vehicle-reported coordinates for tracking at 415. Indicators of arrival can include, but are not limited to, vehicle-reported coordinates corresponding to the community location and/or use of a transponder or access code to access the community.

Many of the sub-processes shown tend to spool while they wait for vehicle arrival, but it is appreciated that delay of one sub-process for execution does not mean the next sub-process cannot simultaneously or subsequently execute. For example, if an elevator sub-process is waiting for a vehicle to be in proximity in order to execute, this does not mean that a door open sub-process will also wait until the elevator sub-process completes, but instead can be executed in parallel to unlock doors as appropriate without waiting for a prior sub-process to complete. Thus, the sub-processes are shown in no particular order, and are illustrative of the types of sub-processes that could be executed in parallel in order to provide maximum access with minimal delay.

In this example, the processor 133 determines if any elevator requests are pending at 417. This would be the result of a vehicle communicating such a request through local infrastructure or a dispatch system 153 request. It is worth mentioning that vehicles 101 can communicate with processor 133 through a local on-site network and that the vehicle 101 can request access and elevators directly if necessary. Even if a database of building details is not available, the vehicle on-site can send a command to the effect of, for example, "unlock exterior door of 1234 Maple Rd, unlock interior door to Apt 223, and send an elevator to the ground floor." Then, if the processor 133 is capable, it can respond to the request by performing the requested actions. By using a standardized API or standardized command strings, for example, EMS vehicles can at least send instructions for execution by local processors, even if the local community has not yet provided full access credentials and floorplans to a remote database 155.

If an elevator request is pending at 417, the processor 133 can lockout an elevator 419 and send it to an appropriate floor until the vehicle arrives at 421. Until the vehicle 101 arrives, the elevator will simply wait at the appropriate floor and may be unusable. Once the vehicle arrives at 421, the processor 133 can unlock the elevator at 423, so that it can be used. While a person could conceivably use the elevator in the interim (while the EMS technicians travel into the building), unless the elevator is capable of reacting to EMS tech presence or a code input, or otherwise unlocking, some provision for re-enabling the elevator for use should be made.

Also, in this example, the processor 133 determines whether any door unlocks are requested at 425. If such requests are made, then the processor determines 133 if any EMS technicians, vehicles 101 or portable devices are in an appropriate proximity to a given door at 427. This is only assuming that proximity triggers are required, if they are not required then the processor 133 can proceed directly to unlocking the doors at 439. Otherwise, doors are unlocked by the processor 133 as the various associated proximity triggers are met based on wireless signals, code input or operator identification of situational variables (e.g., an onsite security guard confirms EMS technicians are present, and this executes a plurality of triggered commands).

In a similar manner, the processor 133 determines if any strategic lighting control has been requested at 431. If so, the processor 133 again determines if any proximity or other triggers are met at 433, and then, responsive to the triggers (or responsive to any reasonable basis for enabling the lighting, such as simply responding to the emergency call in general), the processor 133 engages strategic lighting control at 435. As previously noted, this can include, but is not limited to, changing interior or exterior lighting colors, illuminating special lights, changing light emission patterns, changing levels of illumination, etc. in order to mark a visible path to a desired location either at a building or within a building. The processor can repeat some or all of these processes until the vehicle 101 exits the community at 407 or another all-clear is signaled by an onsite staff, the dispatch system 153, the vehicle 101 or another appropriate entity.

Through the illustrative embodiments, vehicle connectivity and electronically controllable systems can work in conjunction to speed up and facilitate emergency access in a manner that can improve response times and provide extra seconds in situations where such seconds may be important. While these systems would often rely on some form of cooperation from a community, integration of these systems may improve the overall medical response time for the community and thus may be incentivized for integration.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
   a processor configured to
   responsive to an emergency vehicle being dispatched to a dispatch address within a predefined gated community, access a database to obtain a custom map pre-associated with the gated community; and
   determine a path to an emergency location within the gated community, based at least in part on the custom map, wherein the custom map is a street-level map that includes building entrance indications and the path determination includes determining a street-level path, based on the street-level map, that directs the vehicle to a specific location associated with a specific entrance;
   determine the specific entrance according to a type of emergency reported in an initial emergency request; and
   send the path and the custom map to the vehicle, responsive to determining the path.

2. The system of claim 1, wherein the processor is further configured to determine the specific entrance according to the type of emergency corresponding to a need for a certain type of building access to accommodate medical equipment and further based on a building custom map obtained from the database indicating an entrance that accommodates the passage of medical equipment.

3. The system of claim 2, wherein the entrance that allows for the medical equipment to be accommodated includes an entrance large enough to accommodate the medical equipment based on a size of the entrance as indicated by the building custom map compared to a known size of the medical equipment.

4. The system of claim 2, wherein the entrance that allows for the medical equipment to be accommodated includes an entrance leading to an access point for an elevator large enough to accommodate the medical equipment.

5. The system of claim 1, wherein the processor is configured to determine the specific entrance based on an entrance leading to an access point for an elevator reserved for servicing the emergency in advance of emergency technician arrival.

6. The system of claim 1, wherein the processor is further configured to determine, from a record in the database, any access credentials required to pass through a restricted access along the path.

7. The system of claim 6, wherein the processor is configured to send access credentials to the vehicle.

8. The system of claim 7, wherein the access credentials include wireless codes, transmittable by the vehicle, for accessing wirelessly controlled restricted access points.

9. The system of claim 7, wherein the access credentials include driver-inputtable passcodes usable to un-restrict restricted access points following driver passcode input.

10. The system of claim 6, wherein the access credentials include an onsite unlock command, and wherein the processor is configured to request the onsite unlock command from an onsite control system, responsive to receiving an indication that the vehicle is within a predefined distance of a restricted access point unlockable by the onsite unlock command.

11. A system comprising:
a processor configured to:
determine that an emergency vehicle has been dispatched to a predefined gated community, based on a dispatch address being within the gated community;
access a database to obtain a custom map pre-associated with the gated community;
determine a path to an emergency location within the gated community, based on the custom map, the path including a footpath and any building accesses for accessing the emergency location, wherein the custom map is a street-level map that includes indications of the building accesses and the path determination includes determining a street-level path to the footpath, based on the street-level map, that directs the vehicle to a specific location associated with a specific entrance accessible by the footpath;
determine the specific entrance according to a type of emergency reported in an initial emergency request;
determine, based on a record in the database, access credentials associated with any restricted access points along the path; and
facilitate emergency technician pass-through of the restricted access points by delivering access credentials, usable to pass through the restricted access points, to an entity chosen based on a type of access credential required, as indicated by the record.

12. The system of claim 11, wherein the entity is the emergency vehicle and wherein the access credential is a code wirelessly transmittable by the emergency vehicle.

13. The system of claim 11, wherein the entity is an output associated with an emergency technician and wherein the access credential is a code to be manually input by the emergency technician.

14. The system of claim 13, wherein the output is included in a handheld device.

15. The system of claim 13, wherein the output is included in a vehicle.

16. The system of claim 11, wherein the processor is also configured to send a copy of the access credential to an onsite system, onsite at the gated community, when a temporary access credential is provided to an entity other than an onsite system, the copy of the access credential usable by the onsite system to verify the temporary access credential provided to the entity other than the onsite system.

17. The system of claim 11, wherein the entity is an onsite system, onsite at the gated community and wherein the access credential is a specific request to open or unlock a restricted access.

18. A system comprising:
a processor configured to:
determine that an emergency vehicle has been dispatched to a predefined gated community, based on a dispatch address being within the gated community;
access a database to obtain a custom map pre-associated with the gated community;
determine a path to an emergency location within the gated community, based on the custom map, the path including a footpath and any building accesses for accessing the emergency location, wherein the custom map is a street-level map that includes indications of the building accesses and the path determination includes determining a street-level path to the footpath, based on the street-level map, that directs the vehicle to a specific location associated with a specific entrance accessible by the footpath;
determine the specific entrance according to a type of emergency reported in an initial emergency request;
determine, based on a record in the database, access credentials associated with any restricted access points along the path;
and
facilitate emergency technician pass-through of the restricted access points by delivering access credentials, usable to pass through the restricted access points, to an entity chosen based on a type of access credential required, as indicated by the record, wherein the processor is configured to deliver one or more access credentials responsive to the emergency vehicle reaching a location within a predefined distance of a given restricted access point.

* * * * *